UNITED STATES PATENT OFFICE.

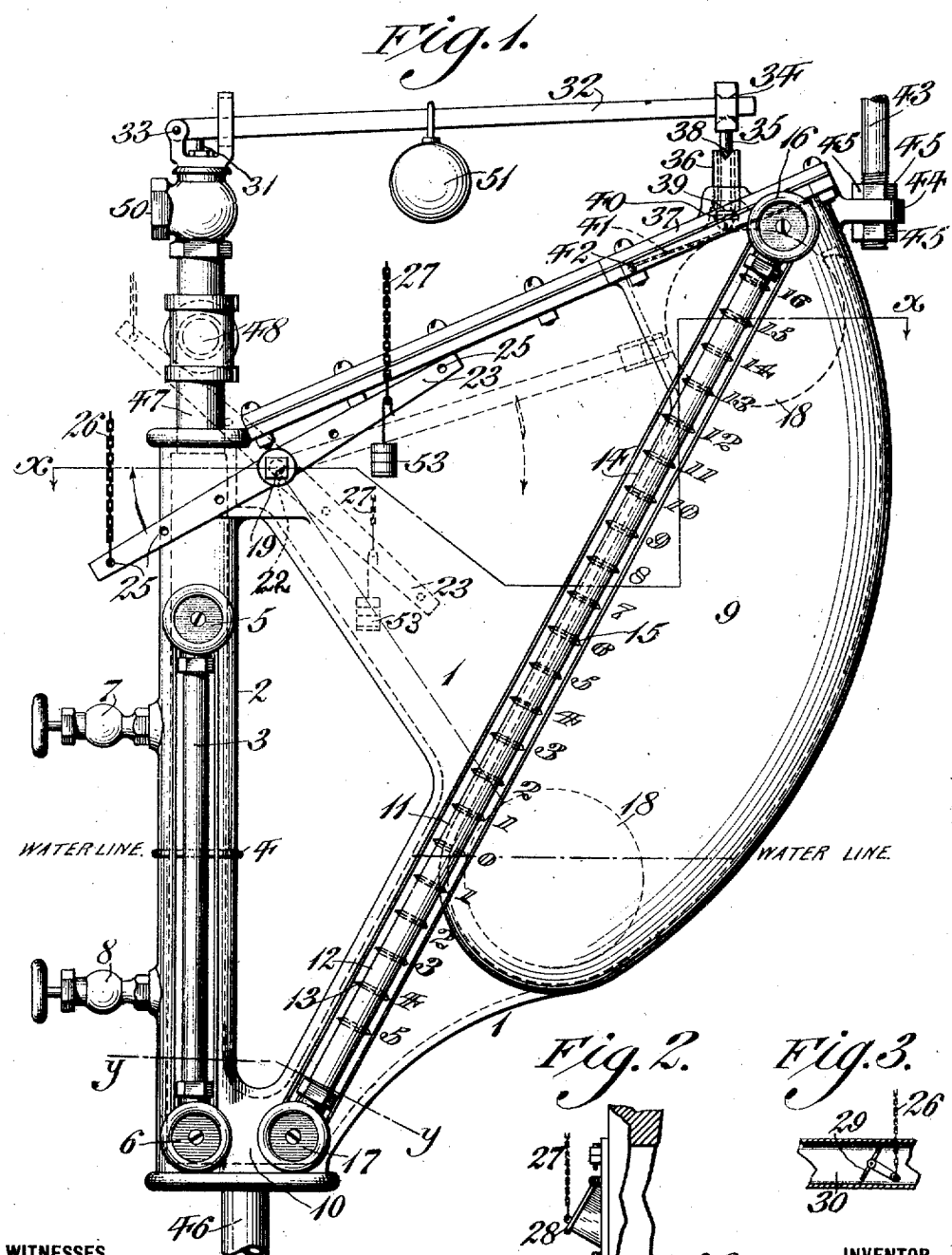

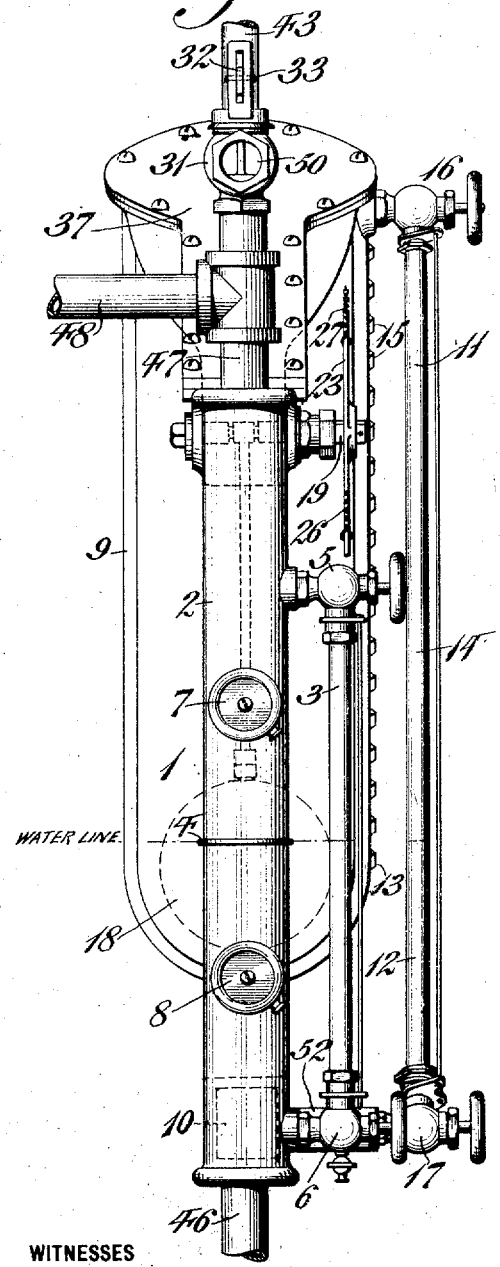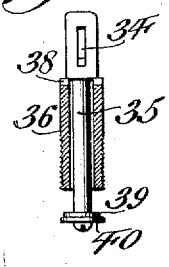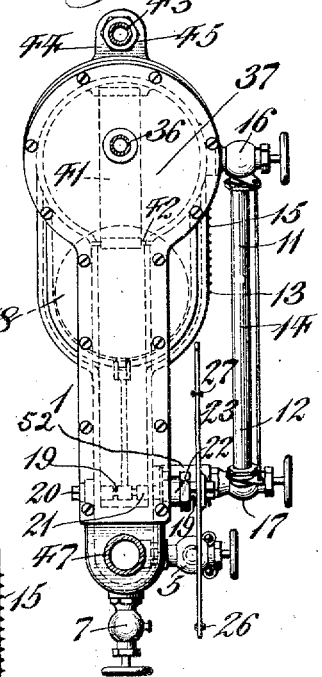

WILLIAM T. FOWDEN, OF CHESTER, PENNSYLVANIA.

COMBINED WATER, VACUUM, AND PRESSURE GAGE, AUTOMATIC REGULATOR, AND SAFETY DEVICE.

987,125.  Specification of Letters Patent.  Patented Mar. 21, 1911.

Application filed May 31, 1910. Serial No. 564,254.

*To all whom it may concern:*

Be it known that I, WILLIAM T. FOWDEN, a citizen of the United States, residing in the city of Chester, county of Delaware, State of Pennsylvania, have invented a new and useful Combined Water, Vacuum, and Pressure Gage, Automatic Regulator, and Safety Device, of which the following is a specification.

My present invention relates to a regulating mechanism which is adapted for a large variety of uses and is especially adapted to be employed for regulating the introduction of air for draft, and the exit of products of combustion from furnaces, although it is to be understood that it is not limited to such use, although I have found my novel device to be particularly adapted to be employed in conjunction with vacuum or atmospheric vapor heating devices.

To the above ends my invention consists of a novel water, vacuum and pressure gage, automatic regulator and safety device, which forms a concrete unitary structure.

It further consists of a novel construction of a water, vacuum and pressure gage wherein is indicated the height of water in the boiler or other device, the amount of pressure being carried and the vacuum obtained, and in conjunction with which a safety valve is employed whereby any excess in pressure is automatically relieved.

It further consists of a novel water, vacuum and pressure gage which forms a concrete unitary device and wherein suitable cocks are provided whereby the water line can be positively tested, and means are provided for suitably securing the device so that the same will be maintained plumb and level.

It further consists of a novel regulator which can be applied to any system or under any conditions in which a low pressure is required for controlling valves or dampers.

It further consists of other novel features of construction, all as will be hereinafter fully set forth.

For the purpose of illustrating my invention, I have shown in the accompanying drawings one form thereof which is at present preferred by me, since the same has been found in practice to give satisfactory and reliable results, although it is to be understood that the various instrumentalities of which my invention consists can be variously arranged and organized and that my invention is not limited to the precise arrangement and organization of these instrumentalities as herein shown and described.

Figure 1 represents a side elevation of a water, vacuum and pressure gage, automatic regulator and safety device, embodying my invention. Fig. 2 represents a sectional view of a portion of a furnace showing more especially the manner in which the cable will be connected thereto. Fig. 3 represents a sectional view showing a portion of the valve controlled flue or stack to which the other cable, seen in Fig. 1, would be connected. Fig. 4 represents an end elevation of my device. Fig. 5 represents a sectional view showing on an enlarged scale the air relief valve employed. Fig. 6 represents a top plan view of my device. Fig. 7 represents a section on line $x-x$, Fig. 1. Fig. 8 represents a section on line $y-y$, Fig. 1. Fig. 9 represents a plan view of a portion of the device showing more clearly the pivotal member which when employed coöperates with the relief valve.

Similar numerals of reference indicate corresponding parts in the figures.

Referring to the drawings:—1 designates a casing or framework, which is adapted to carry all of the parts of my invention, said framework being provided with the water column 2 provided with a gage glass 3; and 4 designates the point at which the water should be carried in the boiler.

5 and 6 designate respectively upper and lower gage cocks which can be closed in case of the breaking of the gage glass 3.

7 and 8 designate respectively upper and lower gage cocks which are employed to test the water or steam line in the boiler in case there should be a stoppage in the valve cocks 5 and 6.

The casing 1 has connected therewith a chambered casing member 9, which communicates, by means of the passage 10, with the water column 2.

11 designates a gage glass, the lower portion of which forms a vacuum gage 12, and the casing is calibrated, as indicated at 13, to indicate the vacuum obtained in inches or ounces or any other desired measurement. The upper portion of the gage glass 11 forms the pressure gage 14 and the casing is calibrated, as is indicated at 15, in order to indicate the amount of pressure being carried either in inches, ounces or other desired measurement. The gage glass 11 is provided at opposite ends with the valves 16 and 17 respectively, whereby the same may be shut off in case of any breakage of the gage glass 11 or when it is desired to remove the gage glass for cleaning or other purposes.

18 designates a float which is located within the chambered member 9 and mounted on shaft 19 so that the hollow ball or float 18 will rise or fall in accordance with the rise or fall of water in said chamber 9. The shaft 19 is mounted in the journals 20 and 21, a suitable packing nut 22 being provided, whereby leakage at such point is positively prevented. The shaft 19 has mounted thereon a lever 23 which, as will be clearly understood by reference to Fig. 1, is provided with a plurality of holes 25 whereby the chains or connections 26 and 27 respectively may be adjustably secured thereto when my novel construction of regulator is to be employed to regulate combustion in furnaces. In order to control the exit of the products of combustion from the furnace the connection 27 will be suitably secured to the door 28 or other control for the introduction of air for draft, while the connection 26 will be connected to the damper 29 in the flue 30 through which the products of combustion pass from the furnace, although it is of course to be understood that I have simply shown Figs. 2 and 3 in order to clearly illustrate one manner in which my novel regulator may be employed, and the same is not limited to the control of combustion in furnaces but can be employed in all cases where a low pressure is required for controlling valves or other devices.

31 designates a safety valve provided with a controlling arm 32 which is pivotally supported at 33 in such a manner to control the movement of the safety valve stem, said controlling arm being provided with an adjustable counterbalance 51 and the end of said arm passing through the aperture 34 in the air relief valve 35, which latter is mounted in a casing 36 having threaded engagement with the cover plate 37 of the chambered member 9. The upper end of the casing 36 is provided with the ports or recesses 38 and the valve 35 is of less diameter than the internal diameter of the casing 36 so that when the parts are in the position seen in Fig. 5 the air may pass around the valve stem 35 and through the ports 38 to the atmosphere. The lower end of the valve stem 35 has secured thereto in any desired manner one or more washers 39, the same being retained in position in the present instance by means of the fastening device 40. The washer nearest the casing 36 is preferably made of resilient material.

41 designates a plate or member which is pivotally supported at 42 in such a manner that it may freely move up and down, its downward movement being suitably limited and this member is located in alinement with the lower end of the valve 35 so that when the float 18 reaches its highest position it will contact with the plate or member 41, causing the same to engage the lower end of the valve 35 so that the latter will be raised until the washer 39 contacts with the lower end of the casing 36. In many cases, arising in practice, it is not necessary to employ the member 41 and this is simply used in order to provide for the proper actuation of the valve 35 by the float 18, since in some cases the float does not always travel in the same path.

My novel construction of regulator is secured in position by means of the arm or member 43, one end of which is secured to any suitable point of support, while the other end thereof is maintained in assembled position with respect to the bracket 44 of the member 9 by means of the fastening devices 45.

46 designates a conduit which is connected either at the bottom of the boiler or at any point within the boiler preferably below the water line, where it will be freed from sediment.

47 designates a pipe or conduit which is connected with the water column and also with the boiler by means of the conduit 48.

The casing 1 is provided with an extension 52.

The safety valve 31 is provided with an outlet 50.

If desired, the lever 23 may be provided with a suitable counterbalance 53.

The operation of my novel water, vacuum and pressure gage will now be readily apparent to those skilled in this art and is as follows:—Assuming that the regulator is to be employed in connection with atmospheric vapor heating systems, the water is fed into the boiler until it reaches the point indicated at 4 in the water column 2, before starting a fire. The connection 27 is connected with the draft door 28 or other means for controlling the draft for combustion, and the connection 26 is connected with the damper 29 which controls the exit of the products of combustion from the furnace. The draft door at this time is open and the flue damper will also be open. After the fire is started and the pressure increases it will displace the water in the chambered casing 9 and the float 18 will be raised and owing to the manner in which it is operatively connected with the lever 23, such lever will be rocked, thereby actuating the connections 26 and 27 and the draft door 28 will be closed and the damper 29 will be closed. When the pressure begins to lower, the above described action will be reversed and at the same time the water will hold the same water level as before with a very slight variation on account of the pressure through the conduit 48 being equalized by the pressure through the conduit 46 in connection with the boiler. The reason the water will rise in the casing 9 is owing to the space around the valve or piston 35 which allows the air to escape to the atmosphere. If the pressure in the boiler increases the water will still continue to expand in the casing and the float 18 will be raised until it reaches the bottom of the piston or the member 41, in case such member is employed, and this will cause the piston 35 to rise, and since the controlling lever 32 of the safety valve 31 is connected with the piston 35, as soon as the float 18 comes into contact with such piston the piston will be raised, the result of which will be that the washer 39 will engage the lower end of the cylinder 36 and prevent any escape of water from the chamber within the casing 9. At the same time the controlling lever 32 will be raised, thereby allowing the safety valve 31 to open and the fluid to flow out at 50. In case the water should fall in the boiler, the steam or vapor would flow around through the passage 10 into the chamber in the casing 9, so that the vapor or steam will pass out around the piston or valve 35 to the atmosphere and serve as a tell-tale or indicator at all times whether or not there be any pressure, and should there be any pressure, the water in the bottom of the boiler would raise the float even under these conditions, and close the damper and should the float 18, for any reason, become detached from its rod it would float up in the same manner as if it were attached and coming into contact with the piston or valve 35 the controlling lever would be raised, thereby permitting any excess in pressure to be relieved so that under all conditions arising in practice a safety device is provided which is automatically actuated.

The vacuum indicator can be changed by placing the regulator either above or below the water line by increasing or shortening the length of the conduits 46 and 47, as is apparent.

It will be apparent from Fig. 1 that the only communication between the chamber 2 and the casing 9 in the water column is the passage 10, as shown most clearly in Fig. 8.

It will now be apparent that I have devised a novel and useful construction of a combined water, vacuum and pressure gage, automatic regulator and safety device, which embodies the features of advantage enumerated as desirable in the statement of the invention and the above description, and while I have, in the present instance, shown and described a preferred embodiment thereof which has been found in practice to give satisfactory and reliable results, it is to be understood that the same is susceptible of modification in various particulars without departing from the spirit or scope of the invention or sacrificing any of its advantages.

Having thus described my invention, what I claim as new and desire to secure by Letters Patent, is:—

1. In a regulating mechanism, a casing having a chamber and provided with a water column in communication therewith, a safety valve for the water column, a relief valve for the chamber normally maintained in open position, and a device controlled by the rise and fall of fluid within the chamber for simultaneously closing the relief valve and opening the safety valve.

2. In a regulating mechanism, a casing having a pressure chamber and provided with a water column in communication therewith, a relief valve for said chamber and normally maintained in open position, a float within said chamber for closing said valve, regulating mechanism controlled by said float and a safety valve for controlling steam pressure on the water column and actuated by said relief valve.

3. In a regulating mechanism, a casing having a pressure chamber and provided with a water column in communication therewith, a relief valve for said chamber and normally maintained in open position, a float within said chamber, a movable member disconnected from both said relief valve and said float and located intermediate said float and valve, whereby the latter will be positively closed when said float is in raised position, and regulating mechanism controlled by said float.

4. In a regulating mechanism, a casing having a pressure chamber and provided with a water column in communication therewith, a gage for said column, a vacuum and pressure gage for said chamber a relief valve for the pressure chamber normally maintained in open position, a float within said chamber for closing said relief valve, a shaft operatively connected with said float, and a safety valve for said water column and controlled by said float.

5. In a regulating mechanism, a casing having a pressure chamber and provided with a water column in communication therewith, a plurality of conduits leading from said water column, valves within said water column, a device within said chamber and controlled by the rise and fall of fluid therein, a movable member exterior of said casing actuated by said device, a safety valve for the water column and a relief valve for the pressure chamber normally maintained in open position, said safety and relief valves being simultaneously actuated by said device.

6. In a regulating mechanism, a casing having a chamber therein and provided with a water column in communication with said chamber, conduits communicating with said water column, a safety valve communicating with said water column, a float within said chamber, a relief valve for said chamber controlled by said float, and mechanism actuated by said float.

7. In a regulating mechanism, a casing having a chamber therein and provided with a water column in communication with said chamber, conduits communicating with said water column, a safety valve communicating with said water column, a float within said chamber and controlling said safety valve, a relief valve for said chamber controlled by said float, and mechanism actuated by said float.

8. In a regulating mechanism, a casing provided with a water column and having a chamber communicating at its lower end with said water column, a water gage for said column, a vacuum and pressure gage for said chamber, a float within said chamber, a shaft on which said float is mounted, a lever carried by said shaft, a relief valve normally maintained in open position and adapted to be closed by said float and a safety valve actuated by said relief valve.

9. In a regulating mechanism, a casing provided with a water column and having a chamber communicating at its lower end with said water column, a water gage for said column, a vacuum and pressure gage for said chamber, a float within said chamber, a shaft on which said float is mounted, a lever carried by said shaft, a relief valve normally maintained in open position and adapted to be closed by said float, cables adjustably connected with said lever, a safety valve for the water column, and means controlled by said float for controlling said safety valve.

10. In a regulating mechanism, a casing having a water column and provided with a chamber in communication therewith, a water gage for the water column, a vacuum and pressure gage for said chamber, a float within said chamber, a shaft actuated by said float, a safety valve communicating with the water column, a movable member controlling the opening of said safety valve, and a relief valve normally maintained in open position and adapted to be closed by said float and controlling said movable member.

11. In a regulating mechanism, a casing having a water column and provided with a chamber in communication with the lower end of said water column, a water gage for said water column, a vacuum and pressure gage for said water chamber, a float within said chamber, a shaft actuated by said float, a bar carried by said shaft, cables adjustably connected with said bar, a counterbalance for said bar, a safety device in communication with said water column, a movable member controlling said safety device, a relief valve in communication with said chamber and controlled by said float and controlling said movable member, and a counterbalance for said member.

WILLIAM T. FOWDEN.

Witnesses:
E. HAYWARD FAIRBANKS,
H. S. FAIRBANKS.